(12) United States Patent
Nishida et al.

(10) Patent No.: US 12,518,139 B2
(45) Date of Patent: Jan. 6, 2026

(54) LEARNING APPARATUS, INFORMATION PROCESSING APPARATUS, LEARNING METHOD, INFORMATION PROCESSING METHOD AND PROGRAM

(71) Applicant: NTT, Inc., Tokyo (JP)

(72) Inventors: Kosuke Nishida, Tokyo (JP); Kyosuke Nishida, Tokyo (JP); Itsumi Saito, Tokyo (JP); Hisako Asano, Tokyo (JP); Junji Tomita, Tokyo (JP)

(73) Assignee: NTT, Inc., Tokyo (JP)

( * ) Notice: Subject to any disclaimer, the term of this patent is extended or adjusted under 35 U.S.C. 154(b) by 659 days.

(21) Appl. No.: 17/908,898

(22) PCT Filed: Mar. 6, 2020

(86) PCT No.: PCT/JP2020/009806
§ 371 (c)(1),
(2) Date: Sep. 1, 2022

(87) PCT Pub. No.: WO2021/176714
PCT Pub. Date: Sep. 10, 2021

(65) Prior Publication Data
US 2024/0202495 A1 Jun. 20, 2024

(51) Int. Cl.
*G06N 3/045* (2023.01)
*G06N 3/084* (2023.01)

(52) U.S. Cl.
CPC .............. *G06N 3/045* (2023.01); *G06N 3/084* (2013.01)

(58) Field of Classification Search
CPC ........ G06N 3/045; G06N 3/084; G06F 16/90; G06F 16/908
See application file for complete search history.

(56) References Cited

U.S. PATENT DOCUMENTS

2021/0125516 A1* 4/2021 Nishida ................ G09B 17/003

FOREIGN PATENT DOCUMENTS

JP    2019220142 A    12/2019

OTHER PUBLICATIONS

Nishida et al. (2019) "Answering will summarizing: Multi-task learning for multi-hop QA with evidence extraction" In ACL, pp. 2335-2345.

(Continued)

*Primary Examiner* — Tyler J Torgrimson (57) ABSTRACT

A learning apparatus executes receiving a text and a question associated with the text, and calculating an evidence score expressing a likelihood of a character string included in the text as evidence for an answer to the question by using a model parameter of a first neural network; extracting, by sampling from a predetermined distribution having the evidence score as a parameter, a first set indicating a set of the character strings as the evidence for the answer from the text; receiving the question and the first set and extracting the answer from the first set by using a model parameter of a second neural network; and learning the model parameters of the first and second neural networks by calculating a gradient through error back propagation by using a continuous relaxation and a first loss between the answer and a true answer to the question.

8 Claims, 7 Drawing Sheets

(56) References Cited

OTHER PUBLICATIONS

Devlin et al. (2019) "BERT: Pretraining of Deep Bidirectional Transformers for Language Understanding" Proceedings of NAACL-HLT 2019, Jun. 2-Jun. 7, 2019, Minneapolis, Minnesota, pp. 4171-4186.
Burges et al. (2005) "Learning to rank using gradient descent" In ICML, pp. 89-96.
Yang et al. (2018) "HotpotQA: A dataset for diverse, explainable multi-hop question answering" In EMNLP, pp. 2369-2380.

* cited by examiner

LEARNING APPARATUS, INFORMATION PROCESSING APPARATUS, LEARNING METHOD, INFORMATION PROCESSING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/009806, filed on 6 Mar. 2020, the disclosure of which is hereby incorporated herein by reference in its entirety.

TECHNICAL FIELD

The present disclosure relates to a learning apparatus, an information processing apparatus, a learning method, an information processing method, and a program.

BACKGROUND ART

In recent years, machine reading comprehension for answering questions while referring to and reading a given text has attracted attention, and various machine reading comprehension models have been proposed. Unfortunately, such a machine reading comprehension model is a black box, and the evidence for the answers is not known. To address this issue, a machine reading comprehension model that presents the evidence for an answer has been proposed (NPL 1).

CITATION LIST

Non Patent Literature

NPL 1: K. Nishida, K. Nishida, M. Nagata, A. Otsuka, I. Saito, H. Asano, and J. Tomita. Answering will summarizing: Multi-task learning for multi-hop QA with evidence extraction. In ACL, pp. 2335-2345, 2019.

SUMMARY OF THE INVENTION

Technical Problem

However, evidence presented by the machine reading comprehension model described in NPL 1 above merely reproduces annotations in the training data and is not the evidence in a strict sense.

One embodiment of the present disclosure has been made in view of the above point, and an object of the present disclosure is to implement machine reading comprehension capable of presenting evidence for an answer.

Means for Solving the Problem

To achieve the above object, a learning apparatus according to one embodiment includes an evidence extractor that receives a text and a question associated with the text as input, calculates an evidence score expressing a likelihood of a character string included in the text as evidence for an answer to the question by using a model parameter of a first neural network, and extracts, by sampling from a predetermined distribution having the evidence score as a parameter, a first set indicating a set of character strings as the evidence for the answer from the text, an answer extractor that receives the question and the first set as input, and extracts the answer from the first set by using a model parameter of a second neural network, and a first learning unit that learns the model parameter of the first neural network and the model parameter of the second neural network by calculating a gradient through error back propagation by using a continuous relaxation and a first loss between the answer and a true answer to the question.

Effects of the Invention

Machine reading comprehension capable of presenting the evidence for an answer can be implemented.

DESCRIPTION OF EMBODIMENTS

Hereinafter, an embodiment of the present disclosure will be described. In the present embodiment, a question answering device 10 that implements machine reading comprehension capable of presenting an answer and evidence for the answer when a reference text from which an answer is to be extracted and a question associated with the reference text are given, will be described.

The machine reading comprehension is implemented by a machine reading comprehension model including a neural network. In the present embodiment, a machine reading comprehension model that is capable of presenting evidence for an answer will be referred to as being interpretable, and is defined as follows:

Definition (Interpretable Machine Reading Comprehension Model): An interpretable machine reading comprehension model means that a machine reading comprehension model is composed of the following two models having the respective inputs and outputs.

Evidence model: A model that receives a reference text and a question as input and outputs evidence.
  Answer model: A model that receives evidence and a question as input and outputs an answer. Here, the evidence is a set of substrings of the reference text. In the present embodiment, the evidence is a set of sentences. However, the evidence is not limited to a set of sentences, and may be a set of character strings longer than a sentence (for example, paragraphs or the like) or a set of character strings shorter than a sentence (for example, phrases or the like).

In the interpretable machine reading comprehension model, only character strings included in the evidence among the character strings included in the reference text are input to the answer model. That is, information other than the evidence (for example, a hidden state of the evidence model or the like) is not used in the answer model. For this reason, there are advantages that (1) it is possible to present the evidence for the answer in a strict sense, (2) the answer model has only information about the evidence and the question, and thereby, the reason for predicting the answer can be restricted to evidence that is sufficiently short (that is, evidence that is a character string sufficiently shorter than the reference text), and (3) as the input of the answer model is shortened, processing with a high calculation cost can be allowed in the answer model. In addition, when executing learning through unsupervised learning as described later, there is also an advantage that (4) it is possible to learn the evidence that is necessary for the machine reading comprehension model to answer with high accuracy, instead of manual annotation.

Here, in the present embodiment, there are a time of learning during which parameters of the machine reading comprehension model (that is, the parameters of the evidence model and the parameters of the answer model) are learned, and a time of inference during which machine reading comprehension is performed by the machine reading comprehension model using the learned parameters. Further, in the present embodiment, two methods of learning, that is, supervised learning that uses both correct data of the evidence and correct data of the answer, and unsupervised learning that does not use the correct data of the evidence will be explained as the methods of learning the parameters of the machine reading comprehension model. Thus, the operation of a question answering device 10 "during inference", "during learning (supervised learning)", and "during learning (unsupervised learning)" will be described below.

[During Inference]

First, assuming that the parameters of the machine reading comprehension model have been learned, a case where machine reading comprehension is performed by the machine reading comprehension model using the learned parameters will be described. A reference text P and a question Q associated with the reference text P are input to the question answering device 10 during inference.

<Overall Configuration of Question Answering Device 10 During Inference>

Figure 1:
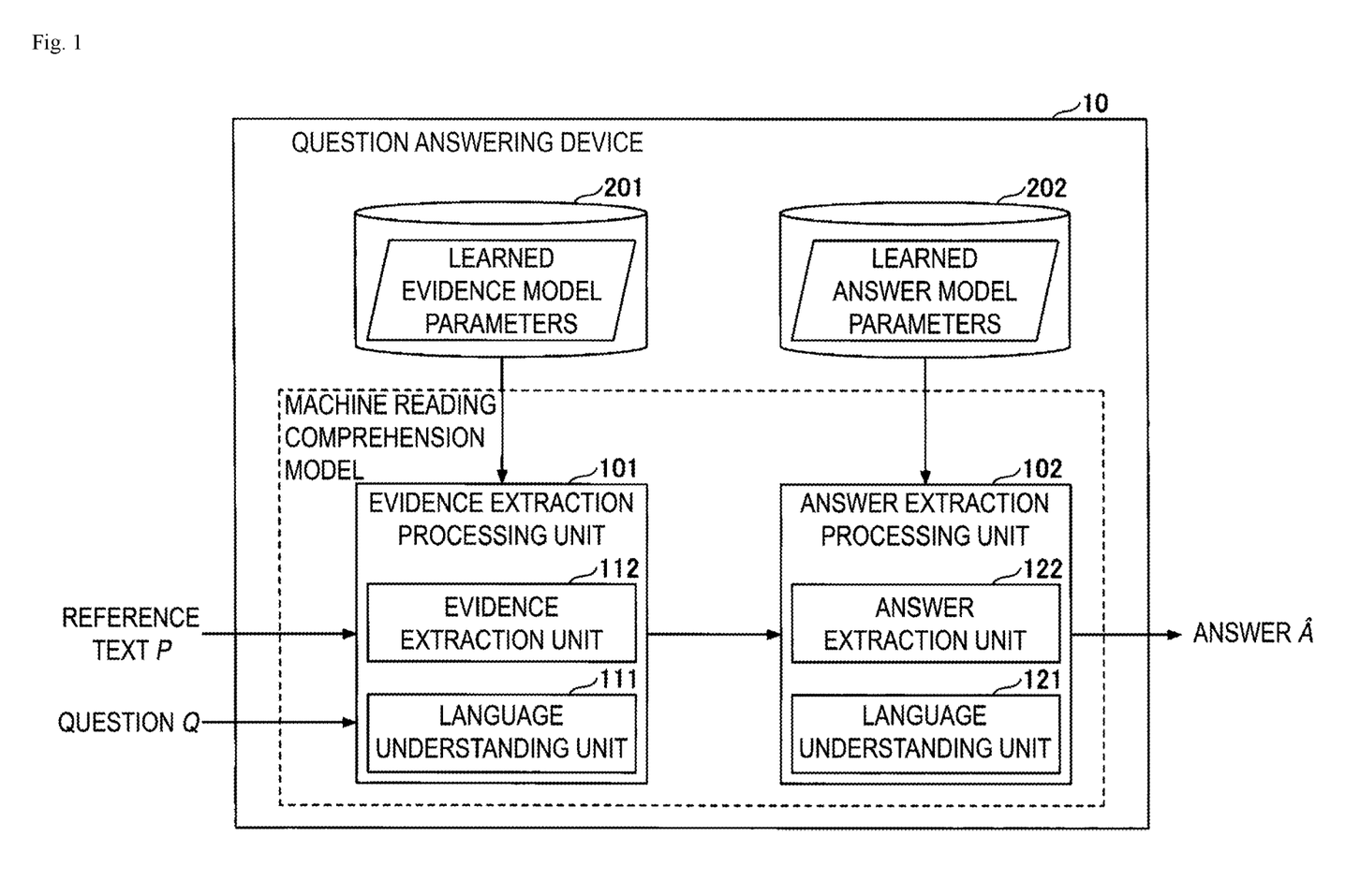
FIG. 1 is a diagram illustrating an example of an overall configuration of a question answering device during inference.

An overall configuration of the question answering device 10 during inference will be described with reference to FIG. 1. FIG. 1 is a diagram illustrating an example of the overall configuration of the question answering device 10 during inference.

As illustrated in FIG. 1, the question answering device 10 during inference includes an evidence extraction processing unit 101 and an answer extraction processing unit 102 that implement the machine reading comprehension model, an evidence model parameter storage unit 201 that stores the parameters of the evidence model (hereinafter, referred to as the "evidence model parameters"), and an answer model parameter storage unit 202 that stores the parameters of the answer model (hereinafter, referred to as the "answer model parameters").

The evidence extraction processing unit 101 is implemented by the evidence model. The evidence extraction processing unit 101 receives the reference text P and the question Q as input, and uses the learned evidence model parameters stored in the evidence model parameter storage unit 201 to output the evidence.

$\hat{R}$ [Math. 1]

Note that in the text of the present specification, a hat "^" representing an estimated value is added before any symbol X to be denoted as "^X". Here, the evidence extraction processing unit 101 includes a language understanding unit 111 and an evidence extraction unit 112.

The language understanding unit 111 receives the reference text P and the question Q as input and outputs a question vector q and a set $\{s_i\}$ of all sentence vectors in the reference text P. The evidence extraction unit 112 receives the question vector q and the sentence vector set $\{s_i\}$ as input and outputs evidence ^R.

The answer extraction processing unit 102 is implemented by the answer model, and receives the evidence ^R and the question Q as input and uses the learned answer model parameters stored in the answer model parameter storage unit 202 to output an answer ^A. Here, the answer extraction processing unit 102 includes a language understanding unit 121 and an answer extraction unit 122.

The language understanding unit 121 receives the evidence ^R and the question Q as input and outputs a vector system H. The answer extraction unit 122 receives the vector sequence H as input and outputs an answer ^A (more accurately, a score of start point and end point as the answer range in the evidence ^R).

In the example illustrated in FIG. 1, although the evidence model parameter storage unit 201 and the answer model parameter storage unit 202 are different storage units, the evidence model parameter storage unit 201 and the answer model parameter storage unit 202 may be the same storage unit. Further, among the evidence model parameters and the answer model parameters, the parameters used by the language understanding unit 111 and the parameters used by the language understanding unit 121 may be the same (that is, the parameters may be shared between the language understanding unit 111 and the language understanding unit 121).

<Inference Processing>

Figure 2:
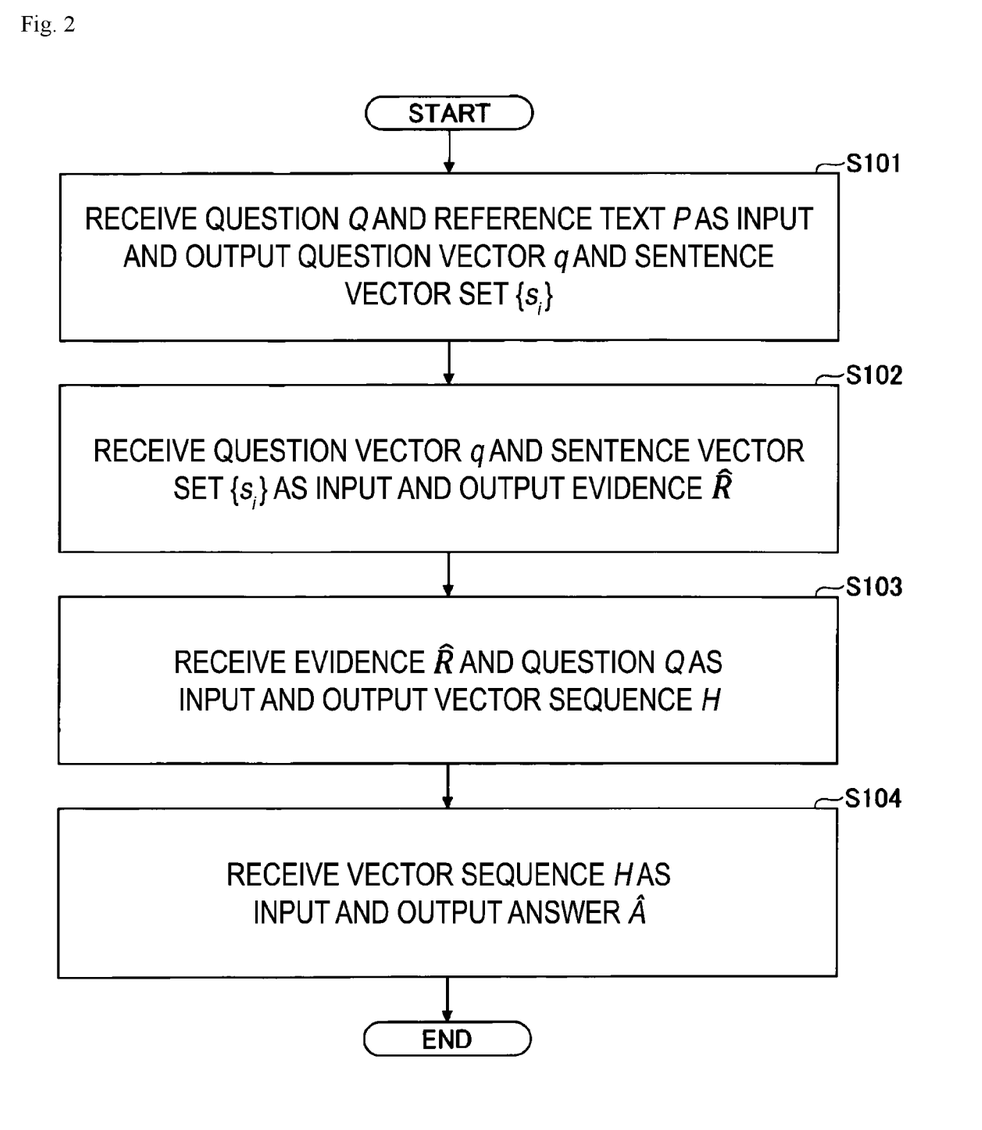
FIG. 2 is a flowchart illustrating an example of inference processing according to the embodiment.

Next, the inference processing according to the present embodiment will be described with reference to FIG. 2. FIG. 2 is a flowchart illustrating an example of the inference processing according to the present embodiment.

First, the language understanding unit 111 of the evidence extraction processing unit 101 receives the reference text P and the question Q as input, and uses the learned evidence model parameters stored in the evidence model parameter storage unit 201 to output the question vector q and the sentence vector set $\{s_i\}$ (step S101).

Specifically, the language understanding unit 111 inputs the reference text P and the question Q as a token sequence of ['[CLS$_Q$]';question;'[SEP$_Q$]';'[CLS$_P$]';sentence 1;'[SEP$_P$]'; . . . ;'[CLS$_P$]';sentence n;'[SEP$_P$]'], to a BERT (Bidirectional Encoder Representations from Transformers). Here, '[CLS$_Q$]', [SEP$_Q$]', '[CLS$_P$]', '[SEP$_P$]' are special tokens, and n is the number of sentences in the reference text P. Note that pre-trained language models other than BERT may also be used.

Then, the language understanding unit 111 defines a vector included in the BERT output at a position corresponding to '[CLS$_Q$]', as the question vector $q \in R^d$, and defines a vector included in the BERT output at a position corresponding to the i-th '[CLS$_P$]', as the i-th sentence vector $s_i \in R^d$. d is the dimension of the BERT output. Note that $R^d$ is a d-dimensional real space.

As a result, the question vector q and the sentence vector set $\{s_i\}$ are obtained. For details on BERT, for example, see Reference Literature 1 "Jacob Devlin, Ming-Wei Chang, Kenton Lee, Kristina Toutanova, "BERT: Pretraining of Deep Bidirectional Transformers for Language Understanding".

For example, if the reference text P is a long sentence and cannot be input to the BERT, the language understanding unit 111 generates a plurality of divided reference texts obtained by dividing the reference text P into appropriate lengths, and then inputs each of the plurality of divided reference texts (and the question Q) to the BERT. In this case, a set of sentence vectors obtained from each divided reference text is used as the sentence vector set $\{s_i\}$, and the average of the question vectors obtained from each divided reference text is used as the question vector q.

Next, the evidence extraction unit 112 of the evidence extraction processing unit 101 receives the question vector q and the sentence vector set $\{s_i\}$ as input, and uses the learned evidence model parameters stored in the evidence model parameter storage unit 201 to output the evidence $\hat{R}$ (step S102). The evidence extraction unit 112 adds an EOE sentence $s_{EOE}$ being a dummy sentence for determining the end of the sentence extraction, to the sentence vector set $\{s_i\}$, and as described in NPL 1, extracts the sentence recursively using a GRU (Gated Recurrent Unit) to obtain the evidence $\hat{R}=\{\hat{r}^t\}$.

That is, at each time t, the evidence extraction unit 112 repeatedly executes the process of extracting a sentence $\hat{r}^t$ and using the sentence vector of the sentence $\hat{r}^t$ to update a question vector $q^t$, until the end condition is satisfied, and obtains the evidence $\hat{R}=\{\hat{r}^t\}$. Specifically, the evidence extraction unit 112 repeatedly executes the following Steps 1 to 4 at each time t (t=0, 1, . . . ). Note that $q^0$=q.

Step 1: The evidence extraction unit 112 uses the question vector $q^t$ to obtain the score of sentence i by the following formula.

$$p_i^t = q^{tT} W_p s_i \in \mathbb{R} \quad \text{[Math. 2]}$$

Here, $W_p \in \mathbb{R}^{d \times d}$ is a learned parameter included in the learned evidence model parameter (that is, $W_p$ is a parameter to be learned in the learning process described later). Note that $\mathbb{R}^{d \times d}$ is a d×d-dimensional real space.

Step 2: Next, the evidence extraction unit 112 extracts the sentence $\hat{r}^t$ by the following formula.

$$\hat{r}^t = \underset{i \in S \setminus \hat{R}^{t-1}}{\arg\max}\, p_i^t \quad \text{[Math. 3]}$$

Here, S is a set of all sentences, and $\hat{R}^{t-1}$ is a set of sentences extracted until time t−1. That is, the evidence extraction unit 112 extracts the sentence having the highest score among the sentences that have not been extracted by then.

Step 3: Next, the evidence extraction unit 112 determines whether the sentence extracted in Step 2 is the EOE sentence $s_{EOE}$. Then, if the sentence extracted in Step 2 above is not the EOE sentence $s_{EOE}$, Step 4 is executed, or if the extracted sentence is the EOE sentence $s_{EOE}$, the processing is terminated. Here, the sentence vector $s_{EOE}$ is a learned parameter included in the learned evidence model parameter (that is, the sentence vector $s_{EOE}$ is a parameter to be learned in the learning process described later).

Step 4: The evidence extraction unit 112 updates the question vector $q^t$ as follows, by using the sentence vector of the sentence extracted in Step 2 above.

$$q^{t+1} = \text{GRU}(s_{\hat{r}^t}; q^t) \in \mathbb{R}^d \quad \text{[Math. 4]}$$

Note that the question vector $q^t$ represents information that needs to be supplemented for answering the question. The initial state $q^0$ is all of the information required to answer the question, and in Step 4 above, it is expected that the information in the extracted sentence $\hat{r}^t$ is removed from $q^t$ by the GRU.

Until the end condition is satisfied (that is, until the EOE sentence $s_{EOE}$ is extracted in Step 2 above), Steps 1 to 4 described above are repeatedly executed at each time t, and the evidence $\hat{R}=\{\hat{r}^t\}$ is obtained.

Next, the language understanding unit 121 of the answer extraction processing unit 102 receives the evidence $\hat{R}$ and the question Q as input, and uses the learned answer model parameters stored in the answer model parameter storage unit 202 to output the vector sequence H (step S103).

Specifically, the language understanding unit 121 inputs the evidence $\hat{R}$ and the question Q as a token sequence of ['[CLS]';question;'[SEP]';sentence $r^1$; . . . sentence $r^T$;' [SEP]'], to the BERT. Here, '[CLS]' and '[SEP]' are special tokens, and T is the number of sentences included in the evidence $\hat{R}$. Note that pre-trained language models other than BERT may also be used.

Then, the language understanding unit 121 outputs the vector sequence $H=[h_1, \ldots, h_k] \in \mathbb{R}^{k \times d}$ for each token. Here, k is the sequence length. Note that $\mathbb{R}^{k \times d}$ is a k×d-dimensional real space.

Next, the answer extraction unit 122 of the answer extraction processing unit 102 receives the vector sequence H as input, and uses the learned answer model parameters stored in the answer model parameter storage unit 202 to output the answer $\hat{A}$ (step S104).

Specifically, the answer extraction unit 122 converts the vector sequence H to a score of the answer by the following linear transformation.

$$[a_{s,i}; a_{e,i}]^T = W_a h_i + b_a \in \mathbb{R}^2 \quad \text{[Math. 5]}$$

Here, $a_{s,i}$ represents a score of the i-th token as the start point of the answer, and $a_{e,i}$ represents a score of the i-th token as the end point of the answer. Moreover, $W_a \in \mathbb{R}^{2 \times d}$ and $b_a \in \mathbb{R}^2$ are learned parameters included in the learned answer model parameters (that is, $W_a$ and $b_a$ are parameters to be learned in the learning process described later). Note that $\mathbb{R}^{2 \times d}$ is a 2×d-dimensional real space, and $\mathbb{R}^2$ is a 2-dimensional real space.

As a result, a score of the i-th token as the start point of the answer and a score of the i-th token as the end point can be obtained. Thus, for example, by setting a token with the highest $a_{s,i}$ as the start point of an answer range and a token with the highest $a_{e,i}$ as the end point of the answer range, the answer range (or a sentence within the answer range) is obtained to be answer $\hat{A}$.

As described above, the question answering device 10 during inference is capable of obtaining the answer $\hat{A}$ from the reference text P and the question Q as input. Moreover, at this time, the question answering device 10 is also capable of obtaining the evidence $\hat{R}$ for the answer $\hat{A}$ (that is, the set of sentences that is the evidence for the answer $\hat{A}$). Note that the answer $\hat{A}$ and the evidence $\hat{R}$ for the answer may be output to any output destination inside or outside the question answering device 10 (for example, a display, a storage device, or another device connected via a communication network).

[During Learning by Supervised Learning]

Next, assuming that the parameters of the machine reading comprehension model have not been learned, a case where the parameters are learned by supervised learning will be described. To the question answering device 10 during learning (supervised learning), a set of training data (training dataset) including the reference text P, the question Q associated with the reference text P, a correct answer A indicating the answer range of a true answer of the question Q, and a correct evidence R indicating a true evidence for the correct answer A are input.

<Overall Configuration of Question Answering Device 10 during Learning by Supervised Learning>

Figure 3:
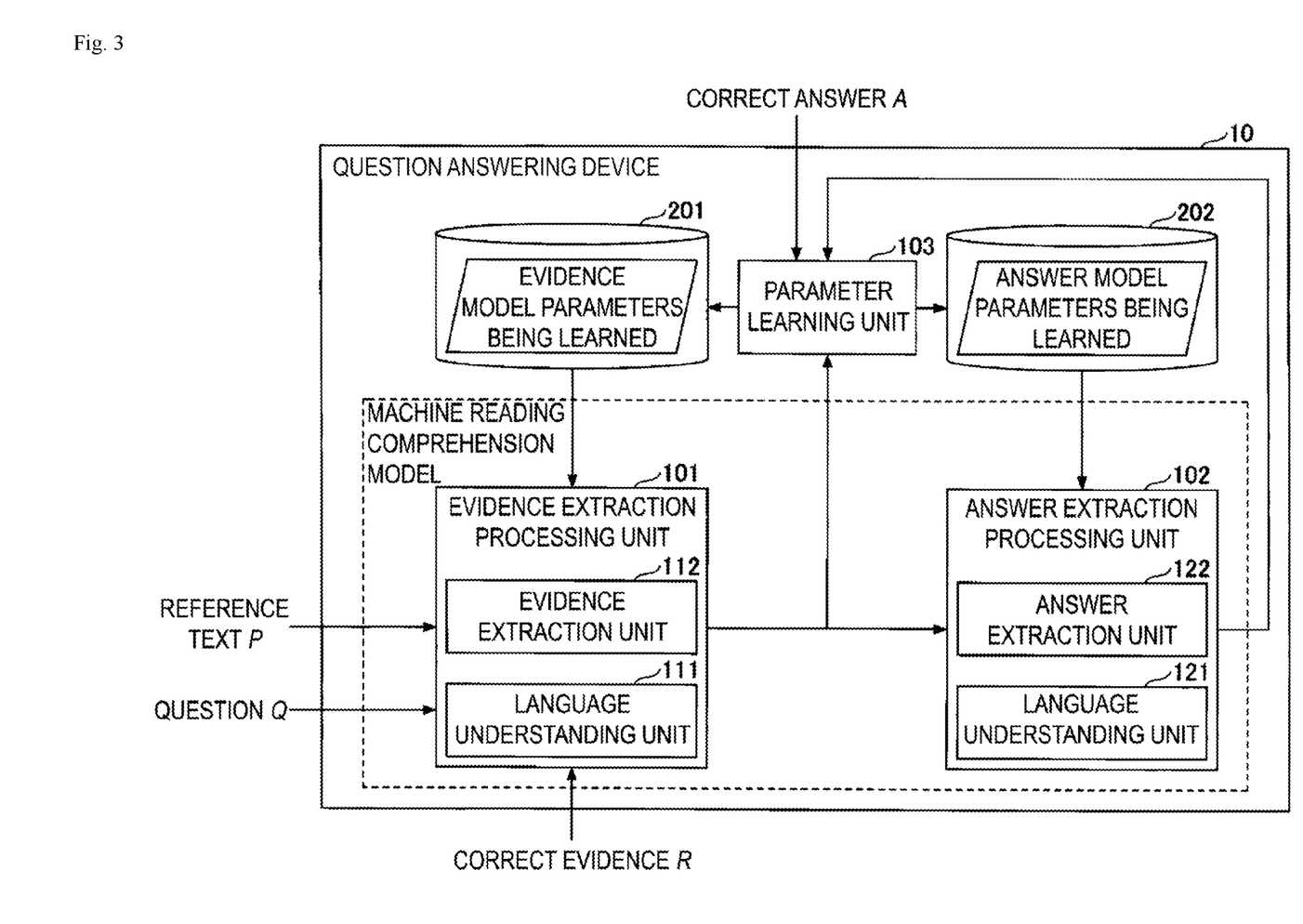
FIG. 3 is a diagram illustrating an example of an overall configuration of a question answering device during learning (supervised learning).

The overall configuration of the question answering device 10 during learning (supervised learning) will be described with reference to FIG. 3. FIG. 3 is a diagram illustrating an example of an overall configuration of the question answering device 10 during learning (supervised learning). Note that FIG. 3 mainly describes the differences from the time of inference, and omits the description of the same components as those during inference.

As illustrated in FIG. 3, the question answering device 10 during learning (supervised learning) includes the evidence extraction processing unit 101 and the answer extraction processing unit 102 that implement the machine reading comprehension model, a parameter learning unit 103 that learns the evidence model parameters and the answer model parameters, the evidence model parameter storage unit 201 that stores the evidence model parameters, and the answer model parameter storage unit 202 that stores the answer model parameters. Evidence model parameters that have not been learned (that is, that are being learned) are stored in the evidence model parameter storage unit 201, and answer model parameters that are being learned are also stored in the answer model parameters.

The parameter learning unit 103 learns the evidence model parameters using the error (loss) between the evidence ^R and the correct evidence R, and learns the answer model parameters using the error (loss) between the answer ^A and the correct answer A.

<Supervised Learning Process>

Figure 4:
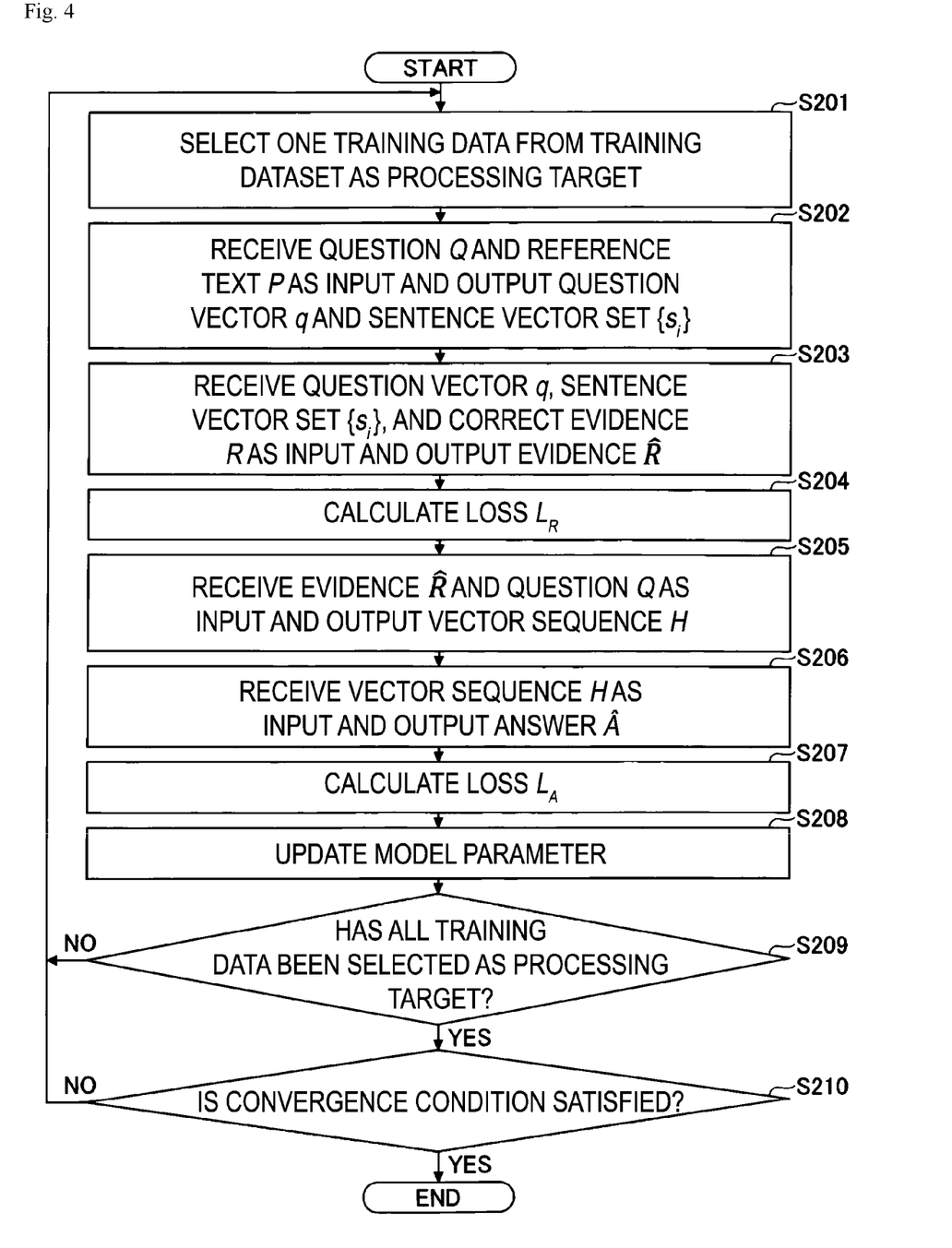
FIG. 4 is a flowchart illustrating an example of supervised learning processing according to the present embodiment.

Next, the supervised learning process according to the present embodiment will be described with reference to FIG. 4. FIG. 4 is a flowchart illustrating an example of supervised learning according to the present embodiment. Hereinafter, a case where the evidence model parameters and the answer model parameters are learned by online learning will be described, but this is merely an example, and batch learning, mini-batch learning, and the like can also be used.

The parameter learning unit 103 selects one set of training data from the training dataset (in other words, a set of the reference text P, the question Q, the correct answer A, and the correct evidence R) as a processing target (step S201).

Next, the language understanding unit 111 of the evidence extraction processing unit 101 receives the reference text P and the question Q included in the training data selected as the processing target in step S201 above as input, and uses the evidence model parameters that are being learned and are stored in the evidence model parameter storage unit 201 to output the question vector q and the sentence vector set $\{s_i\}$ (step S202). Note that the language understanding unit 111 outputs the question vector q and the sentence vector set $\{s_i\}$, by performing the same processing as in step S101 in FIG. 2.

Next, the evidence extraction unit 112 of the evidence extraction processing unit 101 receives the question vector q and the sentence vector set $\{s_i\}$ as input, and uses the evidence model parameters that are being learned and are stored in the evidence model parameter storage unit 201 to output the evidence ^R (step S203). The evidence extraction unit 112 adds the EOE sentence $s_{EOE}$ to the sentence vector set $\{s_i\}$, and then repeatedly executes the above-described Steps 1 to 4 at each time t (t=0, 1, . . . ), similar to step S102 in FIG. 2. However, in extracting the sentence ^r$^t$ in Step 2 above, the evidence extraction unit 112 extracts the sentence ^r$^t$ using Teacher-Forcing. That is, the evidence extraction unit 112 extracts the sentence ^r$^t$ by the following formula.

$$\hat{r}^t = \underset{i \in R \setminus \hat{R}^{t-1}}{\mathrm{argmax}}\ p_i^t \qquad [\text{Math. 6}]$$

Thus, during supervised learning, the evidence extraction unit 112 extracts the sentence ^r$^t$ from the correct evidence R. The EOE sentence $s_{EOE}$ is selected (extracted) after all the sentences in the correct evidence R have been extracted.

Note that because there is no order between the sentences included in the correct evidence R, a sentence having the highest score in the evidence R that is not yet selected by the above-described argmax operation is considered as the correct data for the time t. Thus, when the supervised learning is used, the evidence model is expected to extract (select) sentences in the order of importance of information for the question Q.

Next, the parameter learning unit 103 calculates the average of the negative log likelihood for the extraction of the sentence that is the evidence in each time t, as a loss $L_R$ of the evidence model (step S204). In other words, the parameter learning unit 103 calculates the loss $L_R$ by the following formula.

$$L_R = -\frac{1}{T}\sum_{t=1}^{T} \log\left(Pr\left(\hat{r}^t; \hat{R}^{t-1}\right)\right) \qquad [\text{Math. 7}]$$

Here, Pr(i; ^R$^{t-1}$) is a probability that the sentence i is output at a time t, and is expressed as follows:

$$Pr\left(i; \hat{R}^{t-1}\right) = \underset{i}{\mathrm{softmax}}(p_i^t) \qquad [\text{Math. 8}]$$

Next, the language understanding unit 121 of the answer extraction processing unit 102 receives the evidence ^R and the question Q as input, and uses the answer model parameters that are being learned and that are stored in the answer model parameter storage unit 202 to output the vector sequence H (step S205). Note that the language understanding unit 121 outputs the vector sequence H by performing the same processing as in step S103 in FIG. 2.

Next, the answer extraction unit 122 of the answer extraction processing unit 102 receives the vector sequence H as input, and uses the answer model parameters that are being learned and that are stored in the answer model parameter storage unit 202 to output the answer ^A (step S206). Note that the answer extraction unit 122 outputs the answer ^A by performing the same processing as in step S104 in FIG. 2.

Next, the parameter learning unit 103 calculates the sum of the Cross-Entropy loss of the answer ^A and the correct answer A as a loss $L_A$ of the answer model (step S207). In other words, the parameter learning unit 103 calculates the loss $L_A$ by the following formula.

$$L_A = -\log\ \mathrm{softmax}(a_s)_{i_s} - \log\ \mathrm{softmax}(a_e)_{j_e} \qquad [\text{Math. 9}]$$

Here, $a_s$ is a vector with elements $a_{s,\ i}$, and $a_e$ is a vector with elements $a_{e,\ i}$. $i_s$ is the start point of the answer range indicated by the correct answer A, and $j_e$ is the end point of the answer range.

Next, the parameter learning unit 103 uses the loss $L_R$ calculated in step S204 described above to learn the evidence model parameters, and uses the loss $L_A$ calculated in step S207 described above to learn the answer model parameters (step S208). In other words, the parameter learning unit 103 calculates the value of the loss $L_R$ and the gradient of the loss, and updates the evidence model parameters so that the value of the loss $L_R$ is minimal. Similarly, the parameter learning unit 103 calculates the value of the loss $L_A$ and the gradient of the loss, and updates the answer model parameters so that the value of the loss $L_A$ is minimal.

In the description above, the parameter learning unit 103 minimizes the loss $L_R$ and the loss $L_A$, respectively, however, the parameter learning unit 103 may update the evidence model parameters and the answer model parameters by minimizing the loss $L_R+L_A$.

Next, the parameter learning unit 103 determines whether all of the training data in the training dataset has been selected as the processing target (step S209). If training data that is not yet selected as the processing target exists (NO in step S209), the parameter learning unit 103 returns to step S201. As a result, the above-described steps S201 to S208 are executed for all the training data in the training dataset.

On the other hand, if all the training data in the training dataset has been selected as the processing target (YES in step S209), the parameter learning unit 103 determines whether the convergence condition is satisfied (step S210). If the convergence condition is satisfied (YES in step S210), the parameter learning unit 103 ends the learning process. On the other hand, if the convergence condition is not satisfied (NO in step S210), the parameter learning unit 103 assumes that all the training data in the training dataset has not been selected as the processing target, and then returns to step S201. Here, examples of the convergence condition include, for example, the fact that the number of times the above-described steps S201 to S208 are processed (number of iterations) is greater than or equal to a predetermined number of times.

As described above, the question answering device 10 during learning (supervised learning) is capable of learning the evidence model parameters and the answer model parameters, from the input training data including the reference text P, the question Q, the correct answer A, and the correct evidence R. In FIG. 4, the evidence model parameters and the answer model parameters are learned in one learning process, but the present disclosure is not limited to this, and the evidence model parameters and the answer model parameters may be learned in separate learning processes.

[During Learning by Unsupervised Learning]

Figure 5:
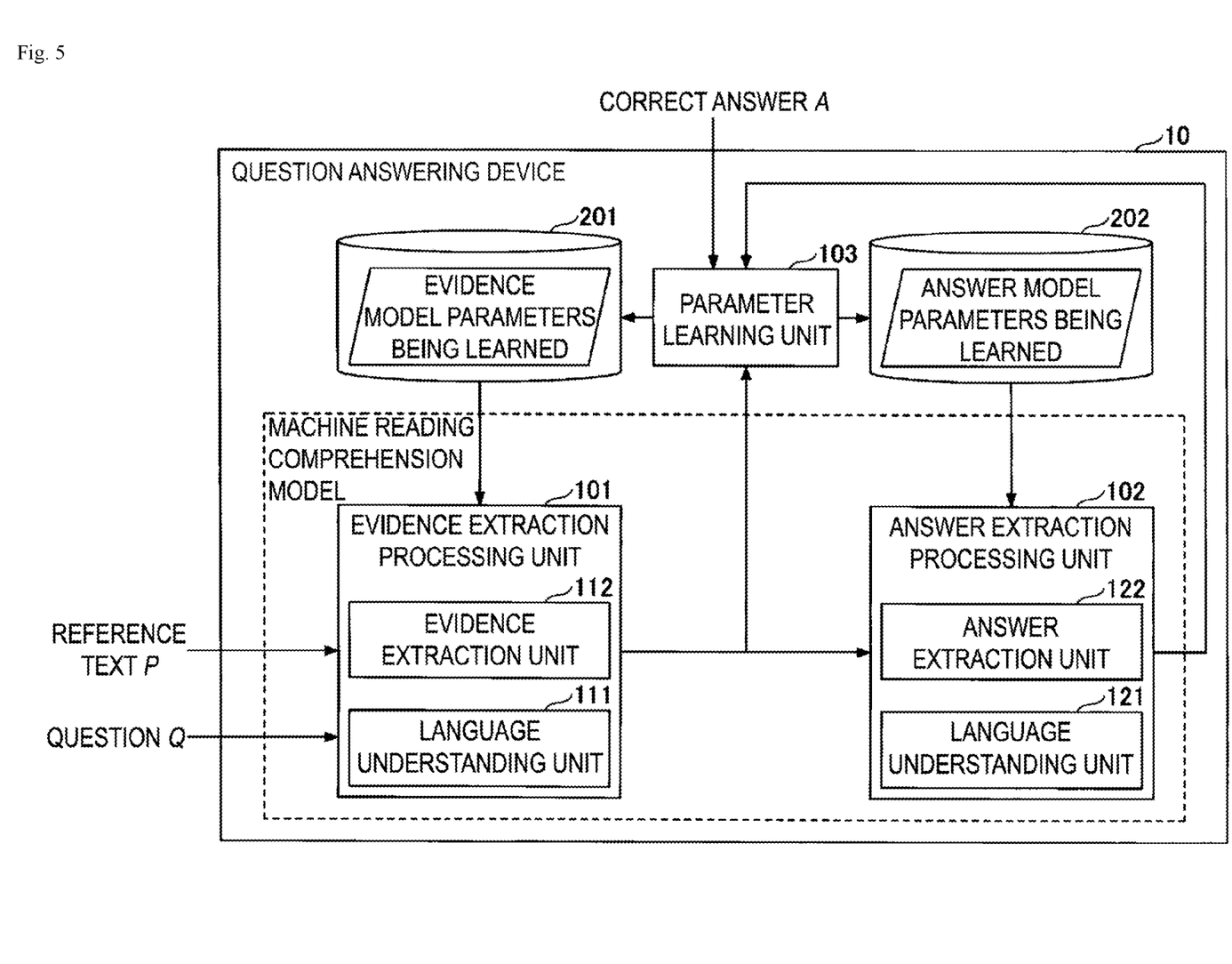
FIG. 5 is a diagram illustrating an example of an overall configuration of a question answering device during learning (unsupervised learning).

Next, a case where the parameters of the machine reading comprehension model are learned by unsupervised learning will be described. In the question answering device 10 during learning (unsupervised learning), a set of training data (training dataset) including the reference text P, the question Q associated with the reference text P, and a correct answer A indicating the answer range of a true answer to the question Q are input. In this way, during unsupervised learning, the correct evidence R indicating the true evidence of the correct answer A is not given (that is, unsupervised means that the correct evidence R is not given). Thus, even if the correct evidence R cannot be obtained or does not exist, the parameters of the machine reading comprehension model can be learned.

<Overall Configuration of Question Answering Device 10 at Time of Learning by Unsupervised Learning>

The overall configuration of the question answering device 10 during learning (unsupervised learning) will be described with reference to FIG. 5. FIG. 5 is a diagram illustrating an example of the overall configuration of the question answering device 10 during learning (unsupervised learning). Note that FIG. 5 mainly describes the differences from the time of inference, and omits the description of the same components as those during inference.

As illustrated in FIG. 5, the question answering device 10 during learning (unsupervised learning) includes the evidence extraction processing unit 101 and the answer extraction processing unit 102 that implement the machine reading comprehension model, the parameter learning unit 103 that learns the evidence model parameters and the answer model parameters, the evidence model parameter storage unit 201 that stores the evidence model parameters, and the answer model parameter storage unit 202 that stores the answer model parameters. Evidence model parameters that are being learned are stored in the evidence model parameter storage unit 201, and answer model parameters that are being learned are also stored in the answer model parameters.

The parameter learning unit 103 uses the loss of the answer ^A to learn the evidence model parameters and the answer model parameters.

<Unsupervised Learning Process>

Figure 6:
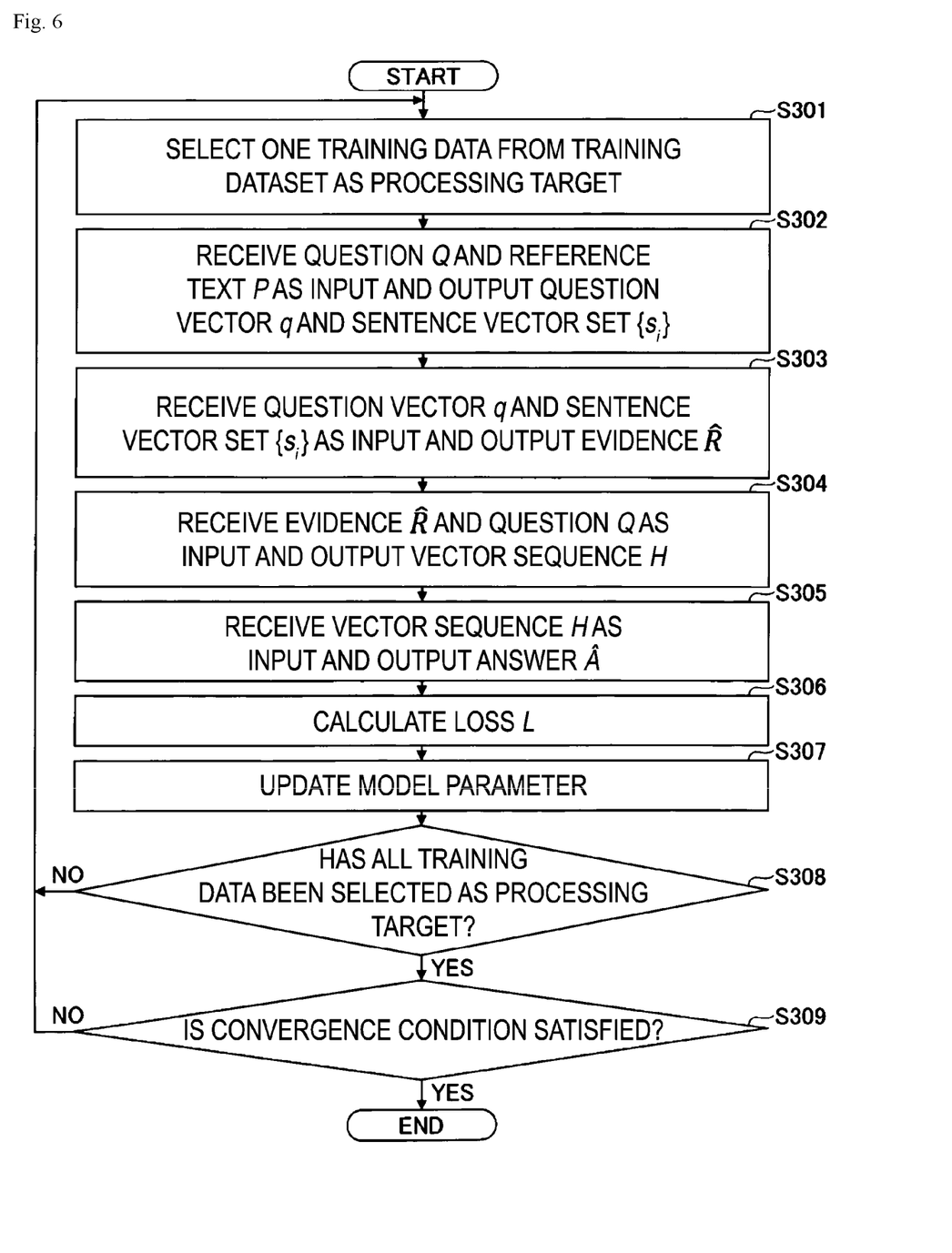
FIG. 6 is a flowchart illustrating an example of unsupervised learning processing according to the present embodiment.

Next, the unsupervised learning process according to the present embodiment will be described with reference to FIG. 6. FIG. 6 is a flowchart illustrating an example of unsupervised learning process according to the present embodiment. Hereinafter, a case where the evidence model parameters and the answer model parameters are learned by online learning will be described, but this is merely an example, and batch learning, mini-batch learning, and the like can also be used.

The parameter learning unit 103 selects one set of training data from the training dataset (in other words, a set of the reference text P, the question Q, and the correct answer A) as a processing target (step S301).

Next, the language understanding unit 111 of the evidence extraction processing unit 101 receives the reference text P and the question Q included in the training data selected as the processing target in step S301 above as input, and uses the evidence model parameters that are being learned and are stored in the evidence model parameter storage unit 201 to output the question vector q and the sentence vector set $\{s_i\}$ (step S302). Note that the language understanding unit 111 outputs the question vector q and the sentence vector set $\{s_i\}$, by performing the same processing as in step S101 in FIG. 2.

Next, the evidence extraction unit 112 of the evidence extraction processing unit 101 receives the question vector q and the sentence vector set $\{s_i\}$ as input, and uses the evidence model parameters that are being learned and are stored in the evidence model parameter storage unit 201 to output the evidence ^R (step S303). The evidence extraction unit 112 adds the EOE sentence $s_{EOE}$ to the sentence vector set $\{s_i\}$, and then repeatedly executes the above-described Steps 1 to 4 at each time t (t=0, 1, . . . ), similar to step S102 in FIG. 2. However, in extracting the sentence ^$r^t$ in Step 2 above, the evidence extraction unit 112 extracts the sentence ^$r^t$ that is the evidence, through sampling by the gumbel-softmax trick, because argmax as an extraction operation of the sentence to be the evidence is indifferentiable.

Specifically, $g_i$ (i=1, . . . , n) is defined as a random variable sampled from a uniform independent Gumbel distribution (that is, $u_i$~Uniform(0,1), $g_i$=−log(−log($u_i$)). The evidence extraction unit 112 determines the sentence ^$r^t$ extracted at time t, according to the following formula.

$$\hat{i}^t = \underset{i}{\operatorname{argmax}}\left(g_i + \log Pr\left(i;\hat{R}^{t-1}\right)\right) \quad \text{[Math. 10]}$$

Note that the formula implies that the text is extracted by sampling from a predetermined first distribution. More specifically, the formula implies that the text is extracted based on a score which is a sum of an evidence score and a random variable according to a predetermined second distribution (in the present embodiment, the Gumbel distribution as an example). Here, the evidence score is the log(Pr(i; ^R$^{t-1}$)) in the formula above, and is a score that expresses the likelihood of the sentence i being the evidence for the answer.

Here, as described above, argmax as an extraction operation to be the evidence is indifferentiable. In addition, the operation of generating a one-hot vector for extracting a sentence from a set of sentences is also indifferentiable. Thus, in calculating the gradient of the loss L described later (that is, when a back propagation (error back propagation) of the loss is performed), a straight-through gumbel-softmax estimator is used as an approximation of the derivative value of the one-hot vector. That is, continuous relaxation (that is, relaxation from a discrete space to a continuous space) of the one-hot vector $$1_{\hat{i}^t} \quad \text{[Math. 11]}$$

is as follows:

$$y_i = \underset{i}{\operatorname{softmax}}\left(\frac{g_i + \log Pr\left(i;\hat{R}^{t-1}\right)}{\tau}\right) \quad \text{[Math. 12]}$$

Here, τ is a temperature parameter. Thus, the following relationship is used.

$$\nabla 1_{\hat{i}^t} \approx \nabla y \quad \text{[Math. 13]}$$

Here, y is a vector having $y_i$ as an element.

Next, the language understanding unit 121 of the answer extraction processing unit 102 receives the evidence ^R and the question Q as input, and uses the answer model parameters that are being learned and that are stored in the answer model parameter storage unit 202 to output the vector sequence H (step S304). Note that the language understanding unit 121 outputs the vector sequence H by performing the same processing as in step S103 in FIG. 2.

Next, the answer extraction unit 122 of the answer extraction processing unit 102 receives the vector sequence H as input, and uses the answer model parameters that are being learned and that are stored in the answer model parameter storage unit 202 to output the answer ^A (step S305). Note that the answer extraction unit 122 outputs the answer ^A by performing the same processing as in step S104 in FIG. 2.

Next, the parameter learning unit 103 calculates the loss L including the loss of the answer A (step S306). As for the loss of the answer A, under normal conditions, it is desirable to use loss −log Pr(A|P, Q) corresponding to the following probability distribution.

$$Pr(A|P, Q) = \sum_{\hat{R}} P(A|\hat{R}, Q) P(\hat{R}|P, Q) \quad \text{[Math. 14]}$$

However, in unsupervised learning, the loss $L_A$ that is an approximation of the loss −log Pr(A|P, Q) is used. This is because Jensen's inequality indicates that the loss $L_A$=−log Pr(A|^R, Q) corresponds to the upper limit of −log Pr(A|P, Q). That is, this is because the following relationship holds.

$$-\log Pr(A|P, Q) = -\log \sum_{\hat{R}} P(A|\hat{R}, Q) P(\hat{R}|P, Q) \leq - \quad \text{[Math. 15]}$$

$$\sum_{\hat{R}} P(\hat{R}|P, Q) \log P(A|\hat{R}, Q) = -$$

$$E_{\hat{R} \sim P(R|P,Q)}[\log P(A|\hat{R}, Q)] \approx -\log Pr(A|\hat{R}, Q)$$

The final approximation is derived by the Gumbel-softmax trick.

By using the loss $L_A$ and the regularization terms $L_C$, $L_N$, and $L_E$ that aim at assisting learning, the loss L is set as L=$L_A$+$\lambda_C L_C$+$\lambda_N L_N$+$\lambda_E L_E$. Here, $\lambda_C$, $\lambda_N$, and $\lambda_E$ are hyperparameters.

The regularization term $L_C$ expresses a penalty for information extracted as the evidence not including information mentioned by the question. By assuming that $$E_Q \in \mathbb{R}^{d \times l_Q}, E_R \in \mathbb{R}^{d \times l_R} \quad \text{[Math. 16]}$$

are word embedding sequences of the question and the evidence, respectively, the regularization term $L_C$ is calculated by the following formula.

$$L_C = -\underset{i}{\operatorname{ave}} \max_j \cos E_{Q,i}^\top E_{R,j} \quad \text{[Math. 17]}$$

Here, $I_Q$ is the length of the question, and $I_R$ is the length of the sentence obtained by linking all the sentences included in the evidence. As for the regularization term $L_C$, it is intended that one or more semantically close words j are included in the sentence extracted as the evidence, for each word i in the question.

The regularization term $L_N$ expresses a penalty for the answer not included in the evidence. The regularization term $L_N$ is calculated by the following formula.

$$L_N = \min_{1 \leq t \leq T} \max(0, p_{\hat{i}^t}^t - p_{a^t}^t) \quad \text{[Math. 18]}$$

$$a^t = \underset{i \in S_A}{\operatorname{argmax}} p_i^t$$

Here, $S_A \subset S$ is a set of sentences including the answer, and at is a sentence that is likely to be chosen the most as the evidence at time t from among the sentences including the answer. The regularization term $L_N$ is the minimum value concerning the time of the value $$\max(0, p_{\hat{i}^t}^t - p_{a^t}^t) \quad \text{[Math. 19]}$$

obtained by assigning ReLU (Rectified Linear Unit) as an activation function to the difference of the score (score of the sentence). If the sentence including the answer is more likely to be selected than the other sentences even once, the following relationship holds, $$p_{\hat{i}^t}^t \leq p_{a^t}^t \quad \text{[Math. 20]}$$

thus resulting in $L_N$=0.

Instead of ReLU, a loss function used in the ranking problem may be used. For example, when the loss function of RankNet is used, the regularization term $L_N$ may be calculated by the following formula.

$$L_N = \min_{1 \le t \le T} \log(1 + \exp(p_{\hat{r}^t}^t - p_{\hat{a}^t}^t)) \quad \text{[Math. 21]}$$

For more information on RankNet, see, for example, Reference Literature 2 "C. Burges, T. Shaked, E. Renshaw, A. Lazier, M. Deeds, N. Hamilton, and G. N. Hullender. Learning to rank using gradient descent. In ICML, pp. 89-96, 2005.", etc.

Note that if the answer is not included in the evidence, the loss $L_A$ cannot be calculated by the Cross-Entropy loss. Thus, if the answer is not included in the evidence, $$\hat{r}^{T+1} = \max_{i \in S_A} p_i^0 \quad \text{[Math. 22]}$$

is added to the evidence $\hat{R}$ before the calculation of the loss $L_A$.

The regularization term $L_E$ is entropy regularization that is often used in reinforcement learning or the like, and is calculated by the following formula.

$$L_E = \frac{1}{T} \sum_t \log Pr(\hat{r}^t; \hat{R}^{t-1}) \quad \text{[Math. 23]}$$

The regularization term $L_E$ corresponds to the negative entropy concerning extraction of the sentence that is the evidence at one time. Increasing the entropy has effects of expanding the search range for the extraction of the sentence and stabilizing the learning.

Next, the parameter learning unit 103 uses the loss L calculated in step S306 described above to learn the evidence model parameters and the answer model parameters (step S307). In other words, the parameter learning unit 103 calculates the value of the loss L and the gradient of the loss, and updates the evidence model parameters and the answer model parameters so that the value of the loss L is minimal.

Next, the parameter learning unit 103 determines whether all of the training data in the training dataset has been selected as the processing target (step S308). If there is a training data that has not yet been selected as the processing target (NO in step S308), the parameter learning unit 103 returns to step S301. As a result, the above-described steps S301 to S307 are executed for all the training data in the training dataset.

On the other hand, if all the training data in the training dataset has been selected as the processing target (YES in step S308), the parameter learning unit 103 determines whether the convergence condition is satisfied (step S309). If the convergence condition is satisfied (YES in step S309), the parameter learning unit 103 ends the learning process. On the other hand, if the convergence condition is not satisfied (NO in step S309), the parameter learning unit 103 assumes that all the training data in the training dataset has not been selected as the processing target, and then returns to step S301. Here, examples of the convergence condition include, for example, the fact that the number of times the above-described steps S301 to S307 are processed (number of iterations) is greater than or equal to a predetermined number of times.

As described above, the question answering device 10 during learning (unsupervised learning) is capable of learning the evidence model parameters and the answer model parameters, from the input training data including the reference text P, the question Q, and the correct answer A (that is, without the correct evidence R as input). In unsupervised learning, it is preferable to perform pre-training for stable learning. If the correct evidence R exists, the above-described supervised learning is used as pre-training. On the other hand, if the correct evidence R does not exist, pre-training is performed by semi-supervised learning using pseudo correct evidence. Such pseudo correct evidence is, for example, a set of sentences each having a label which expresses evidence-likeliness for the sentence and a value of the label equal to or higher than a predetermined threshold value. The value of the label is determined by any appropriate formula, and for example, the TF-IDF similarity between the sentence and the question can be used. At least one of the sentences included in the set $S_A$ of sentences including the answer should be included in the pseudo correct evidence.

<Evaluation>

Hereinafter, evaluation of the present embodiment will be described.

(Datasets)

Evaluation was performed using HotpotQA, which is a dataset having the correct evidence (that is, teaching data of the evidence). In HotpotQA, a question Q is generated to inquire about the content spanning two paragraphs in Wikipedia. The reference text P is a text in which the two paragraphs are connected. The output is the answer A and the evidence R. The answer A is any of the answer labels {yes, no, span} and the answer region (answer range). The answer region exists only when the answer label is "span". Thus, in the answer model, in addition to the classification of the answer region, the answer label was also classified. The question Q is restricted to a question inquiring about the content spanning two paragraphs, and thus, the evidence R is two or more sentences. Hereinafter, for convenience, among the sentences included in the evidence R, a sentence including the answer A will be referred to as an answer sentence, and a sentence not including the answer but necessary for answering will be referred to as an auxiliary sentence. For more details on HotpotQA, for example, see Reference Literature 3 "Z. Yang, P. Qi, S. Zhang, Y. Bengio, W. W. Cohen, R. Salakhutdinov and C. D. Manning. HotpotQA: A dataset for diverse, explainable multi-hop question answering. In EMNLP, pp. 2369-2380, 2018.", etc.

(Experimental Settings)

In the present evaluation, three methods using the $\text{BERT}_{Base}$ were compared. A baseline model is a model without an evidence model, and the reference text P and the question Q are directly input to the answer model. As methods of the present embodiment, supervised learning and additional learning in which unsupervised learning was performed after supervised learning were evaluated. Learning was performed using a Graphics Processing Unit (GPU) with the batch size set to 60, the number of epochs set to 3, Adam as an optimization method, and the learning rate set to 5e-5 for supervised learning, and with the number of epochs set to 1, the learning rate set to 5e-6, $\tau$ set to 0.001, $\lambda_C$ set to 0, $\lambda_N$ set to 1, and $\lambda_E$ set to 0.001 for unsupervised learning.

(Evaluation and Discussion)

Table 1 below shows evaluation results of the answer and evidence when the experiment was conducted with the above datasets and experimental settings.

TABLE 1

|  | ANSWER | EVIDENCE |
|---|---|---|
| BASELINE | 55.0/69.5 | — |
| SUPERVISED LEARNING | 56.5/70.5 | 61.3/87.2 |
| ADDITIONAL LEARNING | 57.6/72.3 | 29.6/80.3 |

Table 1 above shows the evaluation results for Exact match (EM)/F1.

In addition, to verify the effectiveness of an interpretable machine reading comprehension model and additional learning (supervised learning+unsupervised learning), the following research questions (a) to (c) will be discussed.

(a) Do Methods of Present Embodiment Contribute to Improvement in Answer Accuracy?

As for the answer accuracy, performance of the methods of the present embodiment (supervised learning and additional learning) exceeded that of the baseline. In particular, from the fact of exceeding the performance of the baseline, it was confirmed that an interpretable machine reading comprehension model that uses an evidence model before the answer model is capable of answering more accurately than the answer model alone. This is considered because the evidence model has an effect of removing unwanted text, and hence, makes inference in the answer model easier.

Additionally, it was confirmed that the answer accuracy was further improved by additional learning. This is considered because, as a result of additional learning, the evidence model learned the evidence that helps the answer model to answer correctly.

(b) how Did Behavior of Evidence Model Change Due to Additional Learning?

The change in the output of the evidence between supervised learning and additional learning is shown in Table 2 below.

TABLE 2

|  | Precision | Recall | F1 | NUMBER OF SENTENCES |
|---|---|---|---|---|
| SUPERVISED LEARNING | 91.5 | 85.2 | 87.2 | 2.19 |
| ADDITIONAL LEARNING | 71.6 | 96.1 | 80.3 | 3.44 |

As shown in Table 2 above, in supervised learning, sentences were extracted with an emphasis on Precision, but in additional learning, the trend changed to emphasis on Recall. The average increase in the number of extracted sentences was 1.25 sentences.

To investigate the reason for the change to emphasis on Recall, the Recall was evaluated by the type of evidence sentence (answer sentence, auxiliary sentence). The evaluation results are shown in Table 3 below.

TABLE 3

|  | ANSWER SENTENCE | AUXILIARY SENTENCE |
|---|---|---|
| SUPERVISED LEARNING | 86.5 | 84.9 |
| ADDITIONAL LEARNING | 96.2 | 96.8 |

In supervised learning, the answer sentence was more likely to be extracted than the auxiliary sentence. This is considered because the question sentence (the question Q) often uses the expression of the answer sentence.

The reason for the increase in Recall in additional learning can be found in the loss $L_A$ of the answer and the regularization term $L_N$ that expresses a penalty for the answer not existing in the evidence. In Table 3 above, the auxiliary sentence is more likely to be selected than the answer sentence in additional learning. It can be seen that the loss $L_A$ contributes to the change in the extraction of the evidence because the regularization term $L_N$ only has an effect of making the answer sentence more likely to be selected. The result suggests that the evidence model learns, from the loss $L_A$ of the answer, insufficiency of the evidence has a more negative effect than excessiveness of the evidence in answering by the answer model.

(c) How Did Behavior of Answer Model Change Due to Additional Learning?

To evaluate the performance of the answer model alone, development data was classified into four domains of "All", "Exact match", "Excess", and "Insufficient", based on the prediction result of the evidence, and evaluation was thus performed. "All" is the domain of the entire development data, "Exact match" is the domain of the data for which the extraction result ^R of evidence is an exact match of the true evidence R (R=^R) in the supervised learning and additional learning, "Excess" is the domain of the data for which the extraction result ^R of evidence exceeds the true evidence R (R is a proper subset of ^R) in the supervised learning and additional learning, and "Insufficient" is the domain of the data for which the extraction result ^R of evidence is insufficient as compared with the true evidence R (^R is a proper subset of R) in the supervised learning and additional learning. Samples for which the answer label was "span" and the answer sentence was not extracted were not used for analysis because it was not possible to get an answer. The evaluation results in this case are described in Table 4 below.

TABLE 4

|  | ALL | EXACT MATCH | EXCESSIVE | INSUFFICIENT |
|---|---|---|---|---|
| SUPERVISED LEARNING | 57.2/72.3 | 61.5/75.4 | 57.3/72.0 | 52.7/60.3 |
| ADDITIONAL LEARNING | 58.6/74.4 | 63.0/77.0 | 58.3/74.0 | 61.5/67.6 |

Table 4 above shows the evaluation results of EM/F1.

With additional learning, performance improved in all domains. This indicates that apart from the fact that the emphasis was on Recall in the evidence model, the performance improved by additional learning even when the answer model is evaluated alone. In additional learning, predicted evidence is input to the answer model, so it is possible to perform robust learning in a situation close to the time of inference. Thus, it is considered that answering is possible with more accuracy.

Contribution of Methods of Present Embodiment

In the present embodiment, an interpretable machine reading comprehension model is defined, and a learning method based on unsupervised learning is proposed for the first time.

Moreover, in the present embodiment, the interpretable machine reading comprehension model and the learning performance by additional learning were evaluated. Compared to a normal machine reading comprehension model that uses only the answer model, it was confirmed that the accuracy of the interpretable machine reading comprehension model is improved by extracting the evidence in the previous stage. Furthermore, in additional learning, advancement of learning that improves answering accuracy could be observed for each of the answer model and the evidence model.

With the interpretable machine reading comprehension model, it is possible to solve social problems of machine reading comprehension of the related art. For example, it is possible to convince the user, and clarify the source for verification of the facts. Further, by extending the additional learning described in the present embodiment to unsupervised learning from scratch, it is possible to extract the evidence even with datasets that do not have the teaching data of the evidence.

In the present embodiment, the answer is extracted by the answer model after the extraction of the evidence by the evidence model, however, more generally, the present disclosure can be applied to any task implemented by the process of extracting (or searching) a first substring by a first model, and then extracting a second substring from the first substring by a second model, based on a predetermined condition. For example, the present disclosure can also be applied to tasks such as searching a paragraph from a sentence by the first model, and performing reading comprehension (answer extraction or the like) for the paragraph by the second model.

<Hardware Configuration>

Figure 7:
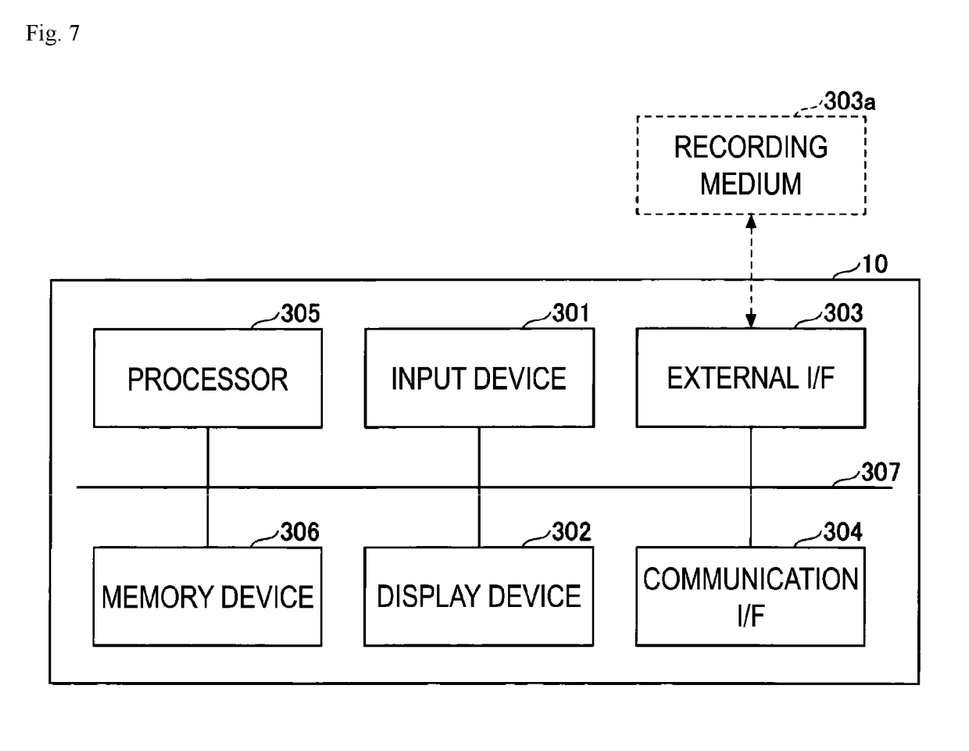
FIG. 7 is a diagram illustrating an example of a hardware configuration of the question answering device according to the present embodiment.

Finally, a hardware configuration of the question answering device 10 according to the present embodiment will be described with reference to FIG. 7. FIG. 7 is a diagram illustrating an example of the hardware configuration of the question answering device 10 according to the present embodiment.

As illustrated in FIG. 7, the question answering device 10 according to the present embodiment is implemented by a general-purpose computer or a computer system, and includes an input device 301, a display device 302, an external I/F 303, a communication I/F 304, a processor 305, and a memory device 306. The pieces of hardware are communicatively connected via a bus 307.

The input device 301 is, for example, a keyboard, a mouse, and a touch panel. The display device 302 is, for example, a display. The question answering device 10 may not include at least one of the input device 301 and the display device 302.

The external I/F 303 is an interface with an external device. An example of the external device includes a recording medium 303a. The question answering device 10 is capable of reading and writing the recording medium 303a via the external I/F 303. One or more programs for implementing the functional units (the evidence extraction processing unit 101, the answer extraction processing unit 102, and the parameter learning unit 103) included in the question answering device 10 may be stored in the recording medium 303a.

The recording medium 303a includes, for example, a compact disc (CD), a digital versatile disk (DVD), a secure digital memory card (SD memory card), and a universal serial bus (USB) memory card.

The communication I/F 304 is an interface for connecting the question answering device 10 to the communication network. At least one program implementing each functional unit included in the question answering device 10 may be obtained (downloaded) from a predetermined server and the like via the communication I/F 304.

The processor 305 is, for example, any of various arithmetic operation devices such as a central processing unit (CPU) and a GPU. For example, the functional units included in the question answering device 10 are implemented by processing for causing the processor 305 to execute one or more programs stored in the memory device 306.

The memory device 306 is, for example, any storage device such as a hard disk drive (HDD), a solid state drive (SSD), a random access memory (RAM), a read only memory (ROM), and a flash memory. The evidence model parameter storage unit 201 and the answer model parameter storage unit 202 included in the question answering device 10 can be implemented, for example, using the memory device 306. For example, at least one of the evidence model parameter storage unit 201 and the answer model parameter storage unit 202 may be implemented by using a storage device (for example, a database server or the like) connected to the question answering device 10 via a communication network.

The question answering device 10 according to the present embodiment is capable of implementing the inference process, the supervised learning process, and the unsupervised learning process described above by having the hardware configuration illustrated in FIG. 7. The hardware configuration illustrated in FIG. 7 is an example, and the question answering device 10 may have another hardware configuration. For example, the question answering device 10 may include a plurality of processors 305 or may include a plurality of memory devices 306.

The present disclosure is not limited to the above-described embodiment disclosed specifically, and various modifications or changes, combinations with known techniques, and the like can be made without departing from description of the claims.

REFERENCE SIGNS LIST

10 Question answering device
101 Evidence extraction processing unit
102 Answer extraction processing unit
103 Parameter learning unit
111 Language understanding unit
112 Evidence extraction unit
121 Language understanding unit
122 Answer extraction unit
201 Evidence model parameter storage unit
202 Answer model parameter storage unit

The invention claimed is:

1. A learning apparatus, comprising:
a memory; and
a processor configured to execute:
receiving a text and a question associated with the text as input, and calculating an evidence score expressing a likelihood of a character string included in the text as evidence for an answer to the question by using a model parameter of a first neural network;
extracting, by sampling from a predetermined distribution having the evidence score as a parameter, a first set indicating a set of the character strings as the evidence for the answer from the text;
receiving the question and the first set as input and extracting the answer from the first set by using a model parameter of a second neural network; and
learning the model parameter of the first neural network and the model parameter of the second neural network by calculating a gradient through error back propagation by using a continuous relaxation and a first loss between the answer and a true answer to the question.

2. The learning apparatus according to claim 1, wherein the learning calculates the first loss by a loss function including a term concerning a penalty for the fact that information expressed by a character string extracted by the extracting does not include information mentioned by the question, and a term concerning a penalty for the fact that the answer is not included in the character string extracted by the extracting.

3. The learning apparatus according to claim 1, wherein the receiving of the text and the question receives the text, the question associated with the text, and a second set indicating a set of character strings as a correct evidence for the answer to the question as input, and the extracting extracts a character string included in the first set from the second set by using the model parameter of the first neural network, and
wherein the processor is further configured to execute:
learning the model parameter of the first neural network by using a second loss between the first set and the second set and learn the model parameter of the second neural network by using a third loss between the answer and the true answer,
wherein the learning of the model parameters by calculating the gradient is executed after the learning of the model parameter of the first neural network by using the second loss.

4. A non-transitory computer-readable recording medium having computer-readable instructions stored thereon, which when executed, cause a computer to operate as the learning apparatus according to claim 1.

5. An information processing apparatus, comprising:
a memory; and
a processor configured to execute:
extracting, based on a text and a question about the text as input, by using a first model parameter of a first neural network, a set of character strings from the text as evidence for an answer to the question from the text; and
extracting, based on the evidence and the question about the text, the answer from the set of character strings by using a second model parameter of a second neural network, wherein the first model parameter of the first neural network and the second model parameter of the second neural network have been trained by calculating a gradient through error back propagation by using a continuous relaxation and a first loss between the answer and a true answer to the question.

6. A non-transitory computer-readable recording medium having computer-readable instructions stored thereon, which when executed, cause a computer to operate as the information processing apparatus according to claim 5.

7. A learning method executed by a computer including a memory and a processor, the learning method comprising:
receiving a text and a question associated with the text as input, calculating an evidence score expressing a likelihood of a character string included in the text as evidence for an answer to the question by using a model parameter of a first neural network, and extracting, by sampling from a predetermined distribution having the evidence score as a parameter, a first set indicating a set of the character strings as the evidence for the answer from the text;
receiving the question and the first set as input and extract the answer from the first set by using a model parameter of a second neural network; and
learning the model parameter of the first neural network and the model parameter of the second neural network by calculating a gradient through error back propagation by using a continuous relaxation and a first loss between the answer and a true answer to the question.

8. An information processing method executed by a computer including a memory and a processor, the information processing method comprising:
extracting, based on a text and a question about the text as input, by using a first model parameter of a first neural network, a set of character strings from the text as being evidence for an answer to the question from the text; and
extracting, based on the evidence and the question about the text, the answer from the set of character strings by using a second model parameter of a second neural network, wherein the first model parameter of the first neural network and the second model parameter of the second neural network have been trained by calculating a gradient through error back propagation by using a continuous relaxation and a first loss between the answer and a true answer to the question.

* * * * *